(12) United States Patent
Parstabar et al.

(10) Patent No.: US 10,924,150 B2
(45) Date of Patent: Feb. 16, 2021

(54) UNIVERSAL MOBILE DEVICE CASES AND METHODS OF MAKING SAME

(71) Applicant: ADVANCED WIRELESS INNOVATIONS, LLC, Simi Valley, CA (US)

(72) Inventors: Amir Parstabar, Simi Valley, CA (US); Ramin Rostami, Simi Valley, CA (US)

(73) Assignee: ADVANCED WIRELESS INNOVATIONS, LLC, Simi Valley, CA (US)

( * ) Notice: Subject to any disclaimer, the term of this patent is extended or adjusted under 35 U.S.C. 154(b) by 0 days.

(21) Appl. No.: 16/830,227

(22) Filed: Mar. 25, 2020

(65) Prior Publication Data

US 2020/0328772 A1    Oct. 15, 2020

Related U.S. Application Data

(60) Provisional application No. 62/823,601, filed on Mar. 25, 2019.

(51) Int. Cl.
*H04M 1/00*   (2006.01)
*H04B 1/3888*   (2015.01)
*A45C 11/00*   (2006.01)

(52) U.S. Cl.
CPC ............ *H04B 1/3888* (2013.01); *A45C 11/00* (2013.01); *A45C 2011/002* (2013.01)

(58) Field of Classification Search
CPC ........ H04M 1/00; H04B 1/3888; A45C 11/00; A45C 2011/002
USPC ...................................................... 455/575.1
See application file for complete search history.

(56) References Cited

U.S. PATENT DOCUMENTS

| 9,675,148 B2 * | 6/2017 | Yuan | A45C 11/00 |
| 9,700,113 B2 * | 7/2017 | Yuan | A45C 11/00 |
| 2015/0374088 A1 * | 12/2015 | Kim | A45C 11/182 |
| | | | 224/576 |

* cited by examiner

*Primary Examiner* — Sonny Trinh
(74) *Attorney, Agent, or Firm* — Hackler Daghighian Martino & Novak

(57) ABSTRACT

An expandable case that can expand to fit any rectangularly shaped mobile device is provided. In a preferred embodiment, the expandable case comprises a rectangular shaped back with a long axis and a short axis; a plurality of non-expandable components configured to form the rectangular shaped back wherein a subset of the plurality of non-expandable components curve around to form sides of the expandable case; a plurality of expandable components that couple the non-expandable components together to form the rectangular shaped back such that the rectangular shaped back can expand along the long and short axis; and, a window located at a top of the back wherein the window extends a full width of the rectangular shaped back and at least a quarter of the way down from a top of the rectangular shaped back.

20 Claims, 5 Drawing Sheets

UNIVERSAL MOBILE DEVICE CASES AND METHODS OF MAKING SAME

CROSS-REFERENCE TO RELATED APPLICATION

This patent document claims the benefit of U.S. Provisional Application Ser. No. 62/823,601, filed on Mar. 25, 2019, the contents of which are incorporated herein by reference in their entirety and are to be considered a part of the specification.

FIELD

This patent document relates to mobile device cases and methods of making mobile device cases. In particular, this patent document relates to mobile phone and tablet cases that fit a variety of different sized, shaped and designed phones and tablets.

BACKGROUND

Mobile devices, such as mobile phones, tablets, e-books etc., have become a ubiquitous part of our society. Given the large price tags on today's mobile devices, consumers almost without exception buy a case to protect their device. In addition, as mobile device manufacturers push towards sleeker and slimmer designs, the mobile devices have become less durable and protective cases are almost a necessity to protect your investment.

At the same time, the mobile device manufacturing market has exploded. Not only has the number of mobile device manufactures increased, but each manufacturer releases new versions of their devices at a dizzying pace. With each new version, the size and shape of the device is tweaked and cameras, speakers and buttons are moved or added.

With such a rapidly changing market, it would be useful to design a mobile device case that could be adapted to not only the numerous existing designs from various different manufactures, but also new unforeseen designs. This could not only reduce redesign costs and the requirement to continually make new molds to produce a new size and shape mobile device case, but also allow consumers to use the same case for an extended period of time and across multiple mobile device purchases.

SUMMARY OF THE EMBODIMENTS

Objects of the present invention are to provide an improved mobile device case and improved methods for making mobile device cases. Although the figures herein show a design for a mobile phone, the design may be used on any mobile device. A slightly scaled version would work equally well for mobile tablets, e-readers, e-books or even certain laptops. To this end, various embodiments of an adaptable mobile device protective case and methods of making the same are provided.

In preferred embodiments, the mobile device case comprises: a first non-expanding component; a second non-expanding component adjacent to the first non-expanding component; a first expanding component coupled between the first non-expanding component and the second non-expanding component; a third non-expanding component adjacent to the first non-expanding component and a fourth non-expanding component wherein, the fourth non-expanding component is adjacent to the second and third non-expanding components; a second expanding component coupled between the third non-expanding component and the fourth non-expanding component; a third expanding component coupled between the first non-expanding component and the third non-expanding component; a fourth expanding component coupled between the second non-expanding component and the fourth non-expanding component.

In some embodiments, the first and second expanding components are made as a single piece. In yet other embodiments, the first, second, third and fourth expanding components are made from a single piece. In preferred embodiments, the expanding components are made from elastic.

In some embodiments, the mobile device case further comprises: a fifth non-expanding component adjacent to the third non-expanding component and a sixth non-expanding component wherein, the sixth non-expanding component is adjacent to the fourth and fifth non-expanding components; a fifth expanding component coupled between the third non-expanding component and the fifth non-expanding component; a sixth expanding component coupled between the fourth non-expanding component and the sixth non-expanding component; and a seventh expanding component coupled between the fifth non-expanding component and the sixth non-expanding component.

In still yet other embodiments, the mobile device case further comprises an eighth expanding component coupled between the first and second non-expanding components above a window.

In some embodiments, a mobile device case is provided that comprises: Four non-expandable components each in one of four quadrants of the case wherein each non-expandable component is coupled to the two other non-expandable components in adjacent quadrants by an expandable component. In yet other embodiments, six or eight non-expandable components are used instead of four.

In some embodiments, an expandable case for a mobile device is provided. In preferred embodiments, the expandable case has a rectangular shaped back with a long axis and a short axis. The long axis runs parallel to the long side of the rectangular shaped back and the short axis runs parallel to the short side of the rectangular shaped back. The long axis and short axis are perpendicular to each other. A plurality of non-expandable components configured to form the rectangular shaped back wherein a subset of the plurality of non-expandable components curve around to form sides of the expandable case; a plurality of expandable components that couple the non-expandable components together to form the rectangular shaped back wherein at least one expandable component is configured to allow expansion of the rectangular shaped back along the long axis and at least one expandable component is configured to allow expansion of the rectangular shaped back along a short axis; and, a window located at a top of the back wherein the window extends a full width of the rectangular shaped back and at least a quarter of the way down from a top of the rectangular shaped back.

In some embodiments, the expandable case has a plurality of non-expandable components arranged in at least two columns and at least two rows. In yet other embodiments, the plurality of non-expandable components are arranged in at least two columns and at least three rows. In some embodiments, the window spans across the two columns.

In some embodiments, the expandable case further comprises a first arm attached to a top right non-expandable component wherein the first arm extends up a right side of the case and bends to form a right top portion of the case; a second arm attached to a top left non-expandable component wherein the second arm extends up a left side of the case and bends to form a left top portion of the case; wherein the first arm and the second arm define a left side, a right side and a top of the window. In some embodiments, an expandable component couples the left arm to the right arm along the top of the window.

In some embodiments, the case has a bottom side that includes an opening and the opening spans at least fifty percent of a length of the bottom side and the opening has at least one gap that divides the opening into two pieces.

In preferred embodiments, each non-expandable component in the plurality of non-expandable components is coupled to all adjacent non-expandable components with a separate expandable component.

DETAILED DESCRIPTION OF THE PREFERRED EMBODIMENTS

A universal mobile device protective case is provided. The protective case can adjust to fit any brand mobile device and model without interfering with any of the device's functions, such as the camera, speakers and buttons. In preferred embodiments, the protective case is designed for and used with a mobile phone.

Figure 1:
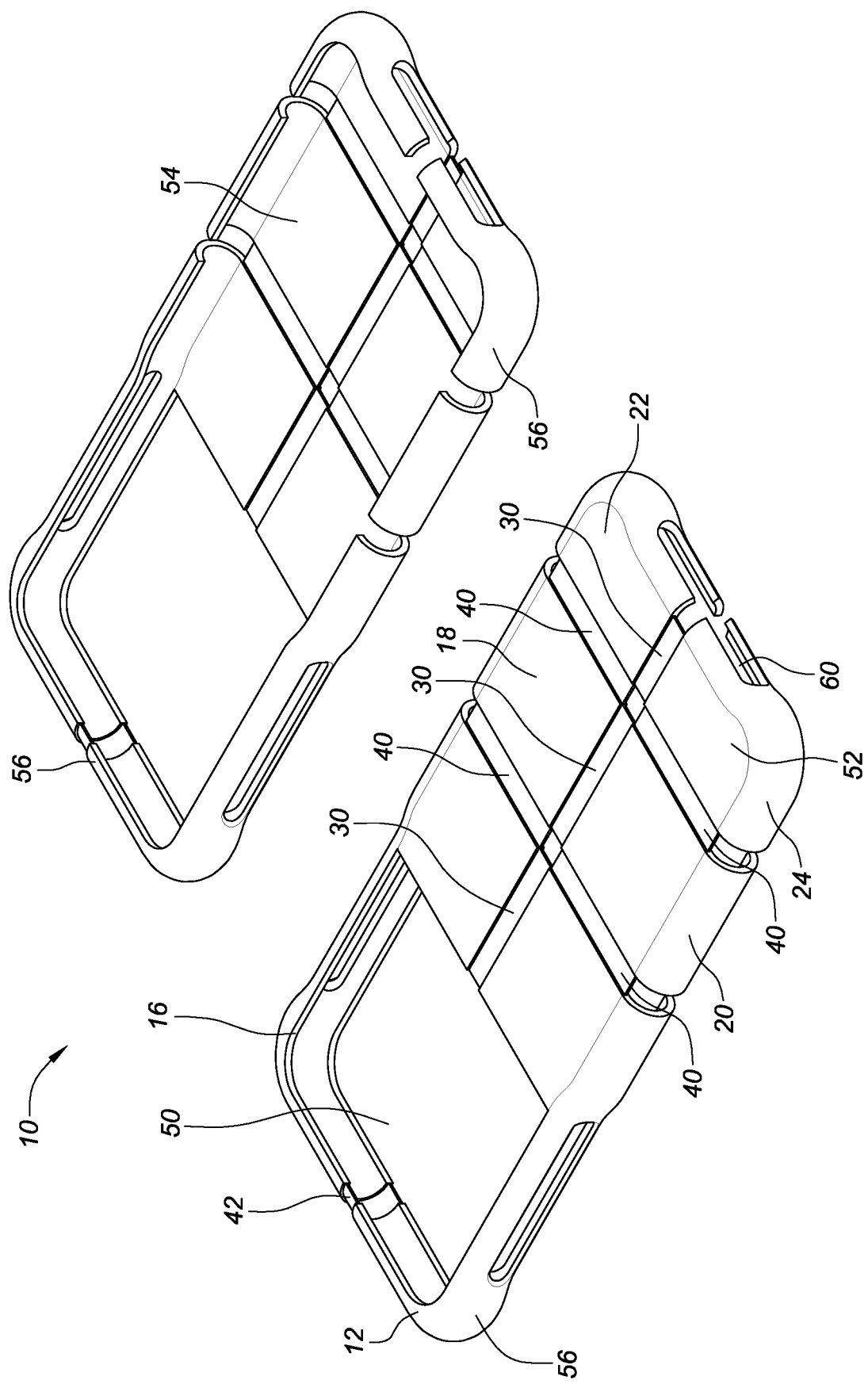
FIG. 1 illustrates an isometric view of a protective case for a mobile device.

FIG. 1 illustrates an isometric view of the front and back of a mobile device protective case 10. As may be seen in FIG. 1, the case is made from a plurality of hard form factor components or non-expanding components 12, 16, 18, 20, 22 and 24. The non-expanding components are coupled together with expandable components 30 and 40. In the embodiment shown in FIG. 1, the non-expanding components 12, 16, 18, 20, 22 and 24 are divided horizontally down the center of the case by a plurality of expandable components 30 that run vertically down the case 10. The expandable components 30 that run vertically down the case 10 allow the case to be adjusted in size in the horizontal direction. In addition, the non-expanding components 12, 16, 18, 20, 22 and 24 are divided vertically across the case 10 by a plurality of expandable components 40 that run horizontally cross the case 10. The expandable components 40 that run horizontally across the case 10 all the case to be adjusted in size in the vertical direction.

In the embodiment shown in FIG. 1, the protective case 10 is comprised of six non-expanding components 12, 16, 18, 20, 22 and 24 that are divided horizontally once and vertically twice by the expanding components 30 and 40. However, in other embodiments, the non-expanding components may be reduced to four pieces and just divided once in both the horizontal and vertical direction. The important feature is the non-expanding components and expanding components are combined in a way that the case 10 can expand in two directions or axes (vertically and horizontally).

As may be seen in FIG. 1, the case 10 includes a back 52 and front 54 and four sides 56. The front 54 is generally just an open space. The front is designed to allow the mobile device to fit into the case 10. The four sides 56 wrap around the edges of mobile device to secure it. The sides 56 generally exert a force against the sides of the mobile device through a snug fit which is facilitated by the spring force of expandable components 30 and 40.

In the embodiment shown in FIG. 1, the front 54 is open and the back 52 is comprised by the non-expandable components 12, 16, 18, 20, 22 and 24 and expandable components 30 and 40. In the embodiment shown in FIG. 1, the sides are created by the non-expandable components 12, 16, 18, 20, 22 and 24 which curve around from the back 52 to create the sides. In the embodiment of FIG. 1, the expandable components 30 and 40 are limited only to the back 52. However, an additional expandable component 42 is located on the top side between the two top non-expandable components 12 and 16 which form the upper most portion of the back 52.

Although in the embodiment of FIG. 1, the expandable portions 30 and 40 do not extend onto the sides 56, in other embodiments the expandable portions 30 and 40 may wrap around to the sides. In yet other embodiments, the expandable portions 30 and 40 may not wrap around to the sides but additional expandable components similar to 42 may be located on the sides between other non-expandable portions. This is particularly true at the bottom where extra support along the bottom side may be required in some embodiments.

In the embodiment shown in FIG. 1, non-expandable components 22 and 24 form a bottom portion of the case 10. Non-expandable component 22 forms the lower right corner of the case 10. Non-expandable component 22 has a flat back portion that is generally rectangular in shape. As the flat rectangular back portion approaches the bottom and the right side, the flat back portion curves around to form a portion of the bottom of the case 10 and a portion of the right side of the case 10 respectively. The right side of the case curves around to meet the bottom in one continuous piece to form the bottom right corner of the case 10.

Non-expandable component 24 forms the lower left corner of the case 10. Non-expandable component 24 is a mirror image of the non-expandable component 22 that forms the lower right corner of the case 10. To this end, non-expandable component 24 has a flat back portion that is generally rectangular in shape. As the flat rectangular back portion approaches the bottom and the left side, the flat back portion curves around to form a portion of the bottom of the case 10 and a portion of the left side of the case 10 respectively. The left side of the case 10 curves around to meet the bottom in one continuous piece to form the bottom left corner of the case 10.

Extending vertically from the bottom of the case 10 up to the top of the non-expandable components 22 and 24 is expandable component 30. Expandable component 30 is flat and lies within the plane that forms the back 52 of the case 10. Expandable component 30 is coupled, and preferably rigidly connected, between non-expandable components 22 and 24. Expandable component 30 allows non-expandable components 22 and 24 to stay coupled together while allowing them to translate one with respect to the other in a horizontal direction. The expandable component 30 allows the case 10 to expand in the horizontal direction and become wider to accommodate a wider mobile device. The expandable component also has the added benefit of keeping the non-expandable components 22 and 24 in constant tension to better secure the case 10 to the mobile device.

Formed in the bottom side of the case 10 is opening 60. Opening 60 spans both non-expandable components 22 and 24. Opening 60 is oval shaped but may be any shape including rectangular. Oval is preferred because it prevents any stress points like are formed at the corners of rectangular cuts. In preferred embodiments, the opening 60 on the bottom side is oversized to accommodate numerous different speakers and charging ports. Preferable, the opening 60 is centered about the central vertical axis of the case. The opening 60 preferably spans at least half of the bottom side. In even more preferred embodiments, the opening 60 spans at least three quarters of the bottom side. In some embodiments, the opening 60 spans almost the entire bottom side or 90% or more of the bottom side.

In the embodiment shown in FIG. 1, there is no additional expandable component on the bottom side 56 of the case. As may be seen, a space exists between the portion of the non-expandable components 22 and 24 that is on the front side of the opening 60. However, in other embodiments, an addition expandable component may be used on the bottom side of the case 10.

In the embodiment shown in FIG. 1, non-expandable components 12 and 16 form a top portion of the case 10. Non-expandable component 16 forms the upper right corner of the case 10. Non-expandable component 16 has a flat back portion that is generally rectangular in shape. Because the top portion of the case has a large window 50, the non-expandable components 12 and 16 are larger than the non-expandable components 22 and 24 on the bottom of the case 10. The non-expandable components 12 and 16 on the top portion of the case 10 are larger to accommodate encompassing the window 50.

As may be seen, each of the non-expandable components 12 and 16 on the top of the case include a flat rectangular back portion that curves around and forms the side and then the side extends up and around the window 50 to form the top side. The non-expandable component 16 on the top right side of the case has an arm that extends up the side and around the window 50 to form the top right side of the case 10. The non-expandable component 12 is a mirror image of the right side component on the left side of the case and has a left arm that extends up around the window to form the top left side of the case.

Extending vertically from the bottom of both of the upper non-extendable components 12 and 16 is expandable component 30. The expandable component 30 extends from the bottom of the non-expandable components 12 and 16 to the bottom of the window 50. Expandable component 30 is flat and lies within the plane that forms the back 52 of the case 10. Expandable component 30 is coupled, and preferably rigidly connected, between non-expandable components 12 and 16. Just like with the bottom portion of the case 10, expandable component 30 allows non-expandable components 12 and 16 to stay coupled together while allowing them to translate one with respect to the other in a horizontal direction. The expandable component 30 allows the case 10 to expand in the horizontal direction and become wider to accommodate a wider mobile device. The expandable component also has the added benefit of keeping the non-expandable components 12 and 16 in constant tension to better secure the case 10 to the mobile device.

As may be seen in FIG. 1, the top of the case 10 and the bottom of the case 10 is separated by a third pair of non-expandable components 18 and 20. However, in other embodiments, components 18 and 20 are not required and the non-expandable components 12 and 16 at the top of the case are coupled to the non-expandable components 22 and 24 at the bottom of the case with expandable components 40. In contrast, in other embodiments, more than one pair of non-expandable components like 18 and 20 may be used between the top of the case and the bottom of the case. The embodiment shown in FIG. 1 has six non-expandable components that make up the case. In other embodiments, four non-expandable components may be used or eight, or ten or more may be used.

The embodiment shown in FIG. 1, has a single pair of non-expandable components 18 and 20 between the upper non-expandable components 12 and 16 and the bottom non-expandable components 22 and 24. Similar to the other non-expandable components discussed so far, each of the non-expandable components 18 and 20 in the center of the case include a flat rectangular back portion that curves around and forms the side of the case. The non-expandable component 18 in the center right side of the case 10 extends around to form the center right side of the case 10. The non-expandable component 20 is a mirror image of the right side component 18 but on the left side of the case. The non-expandable component 20 extends around and forms the left center side of the case 10.

Extending vertically between the non-expandable components 18 and 20 from the bottom up to the top of the non-expandable components 18 and 20 is expandable component 30. Expandable component 30 is flat and lies within the plane that forms the back 52 of the case 10. Expandable component 30 is coupled, and preferably rigidly connected, between non-expandable components 18 and 20. Expandable component 30 allows non-expandable components 18 and 20 to stay coupled together while allowing them to translate one with respect to the other in a horizontal direction. The expandable component 30 allows the case 10 to expand in the horizontal direction and become wider to accommodate a wider mobile device. The expandable component 30 also has the added benefit of keeping the non-expandable components 18 and 20 in constant tension to better secure the case 10 to the mobile device.

As may be appreciated, in the embodiment shown in FIG. 1, there are three expandable components that run vertically down the central axis of the back of the case 10. In the embodiment shown in FIG. 1, three are used and this corresponds to the number of pairs of non-extendable components 12, 16, 18, 20, 22 and 24. However, more than three could be used. For example, two expandable components could be used for each pair of non-expandable components. There is no limit to the number of expandable components that may be used between each pair of non-expandable components other than the physical limitation for how many times the expandable component 30 could be divided in the limited space.

In the embodiment shown in FIG. 1, the expanding components are individual and separate. However, in other embodiments, one or more of the expandable components may be combined and made from a single piece of expandable material. For example, rather than having three expandable components 30, a single expandable component could span from the bottom of the case 10 up to the bottom of the opening 60. In yet other embodiments, two vertical expandable components 30 can be used.

In addition to the vertical expandable components 30, the case 10 has horizontal expandable components 40. As may be seen in FIG. 1, a first set of expandable components 40 extend horizontally between the non-expandable components 12, 16 and 20, 18. A second set of expandable components 40 extend horizontally between the non-expandable components 20, 18 and 24, 22. Similar to the vertical expandable components 30, the horizontal expandable components 40 are flat and lie within the plane that forms the back 52 of the case 10. The first set of expandable components 40 are coupled, and preferably rigidly connected, horizontally between the top non-expandable components 12 and 16 and the center non-expandable components 20 and 18 respectively. The second set of expandable components 40 are coupled, and preferably rigidly connected, horizontally between the bottom non-expandable components 24 and 22 and the center non-expandable components 20 and 18 respectively.

Horizontal expandable components 40 allow the non-expandable components to stay coupled together while allowing them to translate one with respect to the other in a vertical direction. The expandable components 40 allow the case 10 to expand in the horizontal direction and become taller to accommodate a taller mobile device. The expandable components 40 also have the added benefit of keeping the non-expandable components in constant tension to better secure the case 10 to the mobile device.

As may be appreciated, in the embodiment shown in FIG. 1, there are four expandable components 40 that run horizontally across the back of the case 10. In the embodiment shown in FIG. 1, four are used and this corresponds to one less than the number of pairs of non-extendable components 12, 16, 18, 20, 22 and 24. However, more than four could be used. For example, two expandable components could be used for each pair of non-expandable components. There is no limit to the number of expandable components that may be used between each pair of non-expandable components other than the physical limitation for how many times the expandable component 30 could be divided in the limited space.

As may also be appreciated, rather than having four horizontal expandable components 40 in case, a pair of expandable components could be used with each expandable component spanning from one side of the case to the other side across the back of the case 10.

Moreover, to the extent, additional rows of non-expandable components are used to comprise the back of the case, additional horizontal expandable components 40 may be used between each row.

Figure 2:
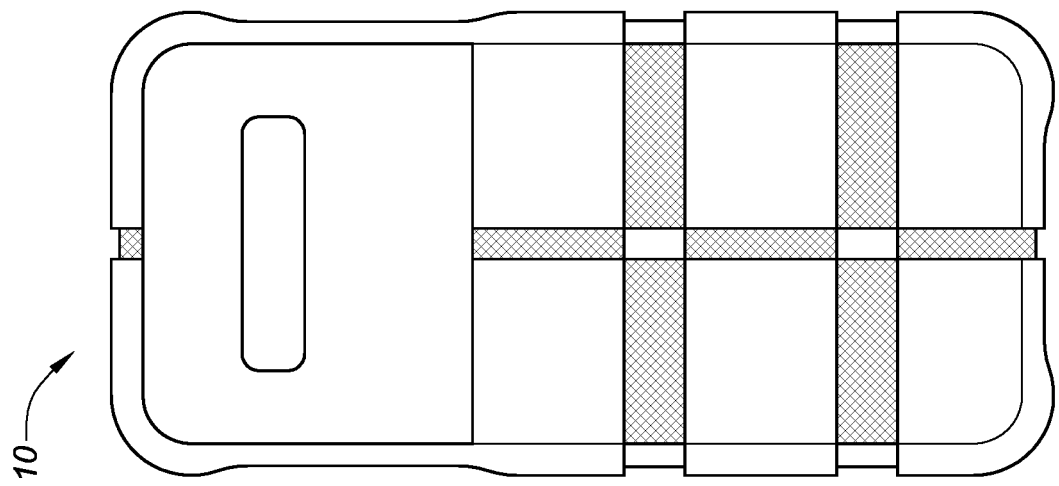
FIG. 2 illustrates the embodiment of a mobile device case of FIG. 1 assembled on a variety of different size mobile devices.
Figure 2:
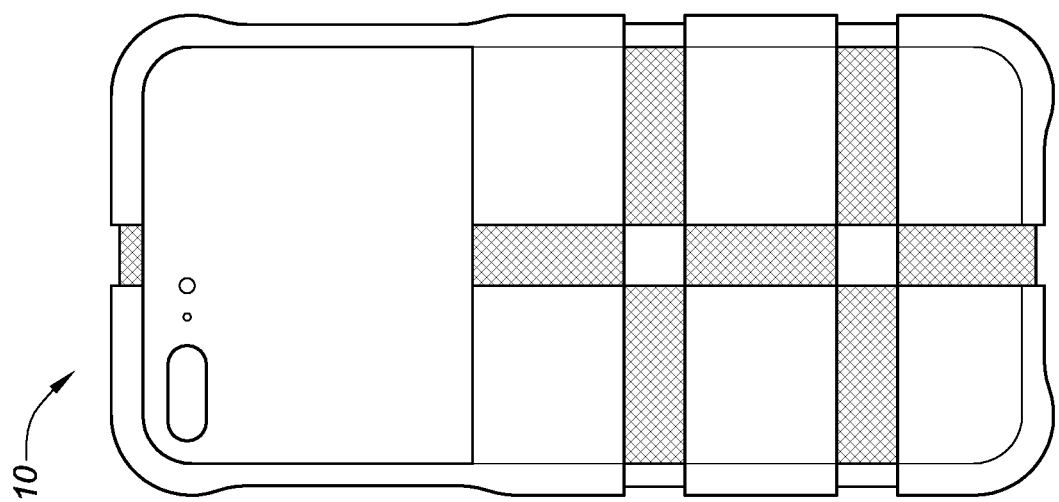
Figure 2:
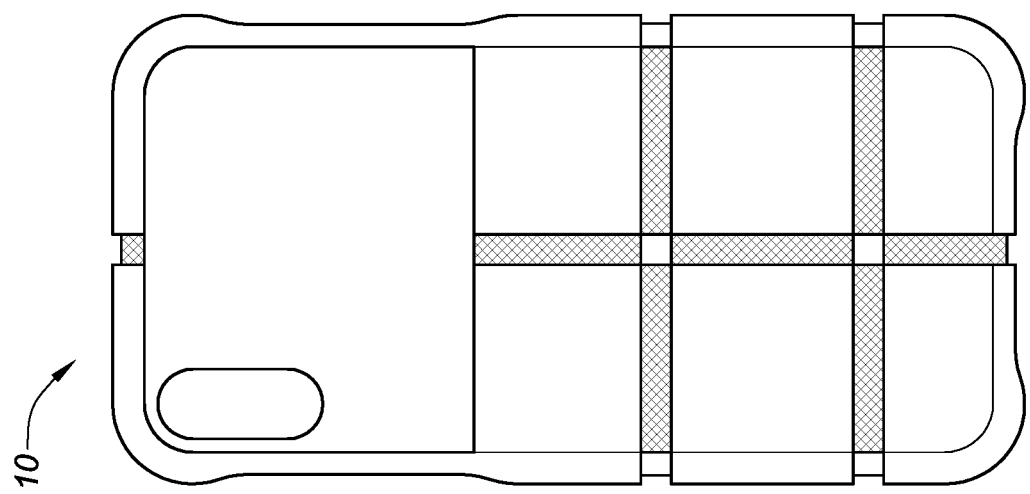

FIG. 2 illustrates the embodiment of a mobile device case of FIG. 1 assembled on a variety of different size mobile devices. As may be appreciated, the expandable components 30 and 40 expand or stretch to allow the case 10 to adapt and cover various different size mobile devices.

As may be appreciated, the back of the case 10 is comprised of a plurality of rows and columns of non-expandable components 12, 16, 18, 20, 22 and 24. The rows are coupled together by at least one expandable component and the columns are similarly coupled together by at least one expandable component. In the embodiment of FIGS. 1 and 2, three rows of non-expandable components are used and two columns of non-expandable components are used. However, in other embodiments, any number or rows or columns could be used with two rows and two columns being the minimum to allow the case to adjust in size in two directions. In some embodiments two, three, four, five or more rows are combined with two, three, four, five or more columns.

Figure 3:
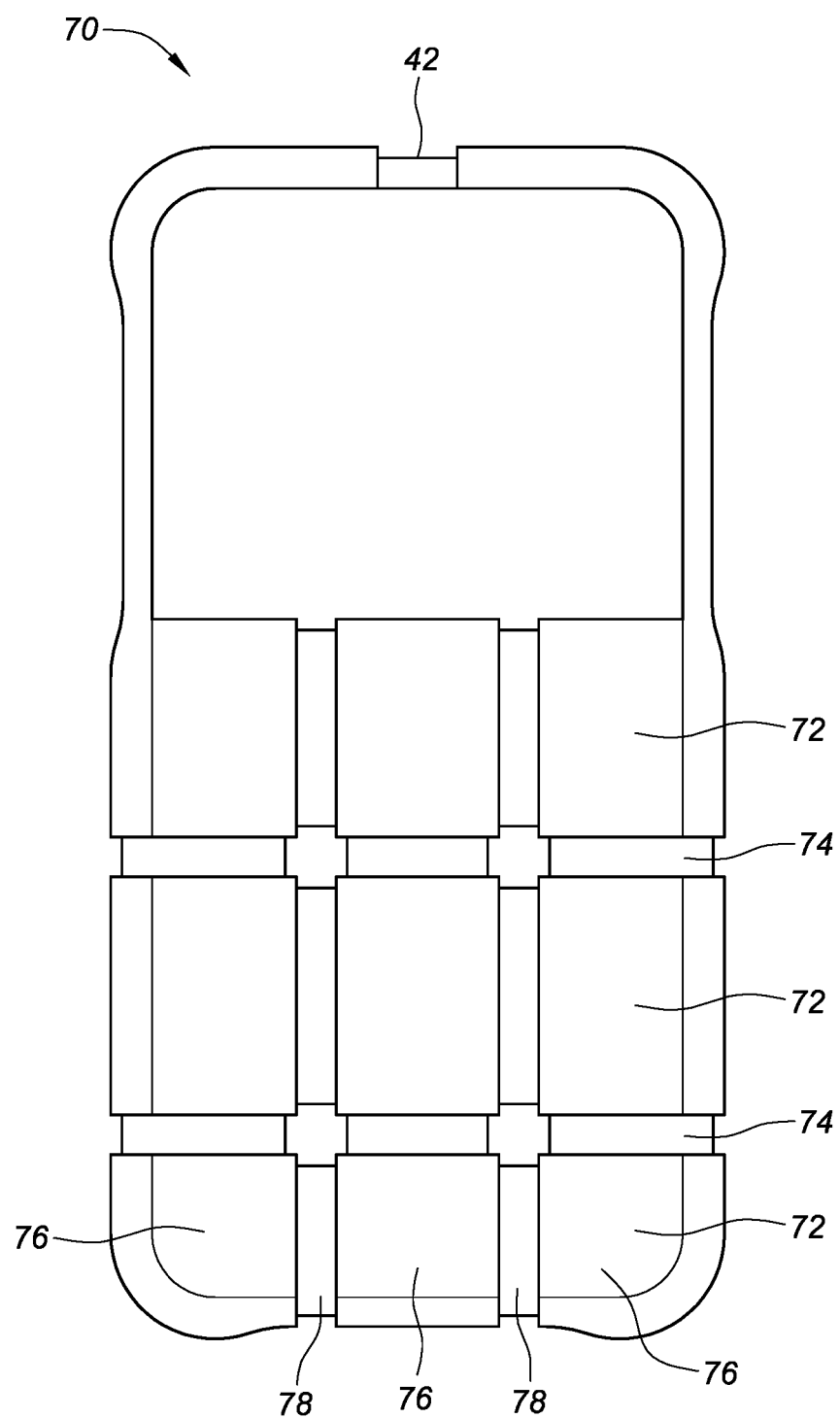
FIG. 3 illustrates an example of an expandable case with three columns and three rows of non-expandable components coupled together with two rows and two columns of expandable components.

FIG. 3 illustrates an example of an expandable case 70 with three columns 76 and three rows 72 of non-expandable components coupled together with two rows 74 and two columns 78 of expandable components.

Figure 4:
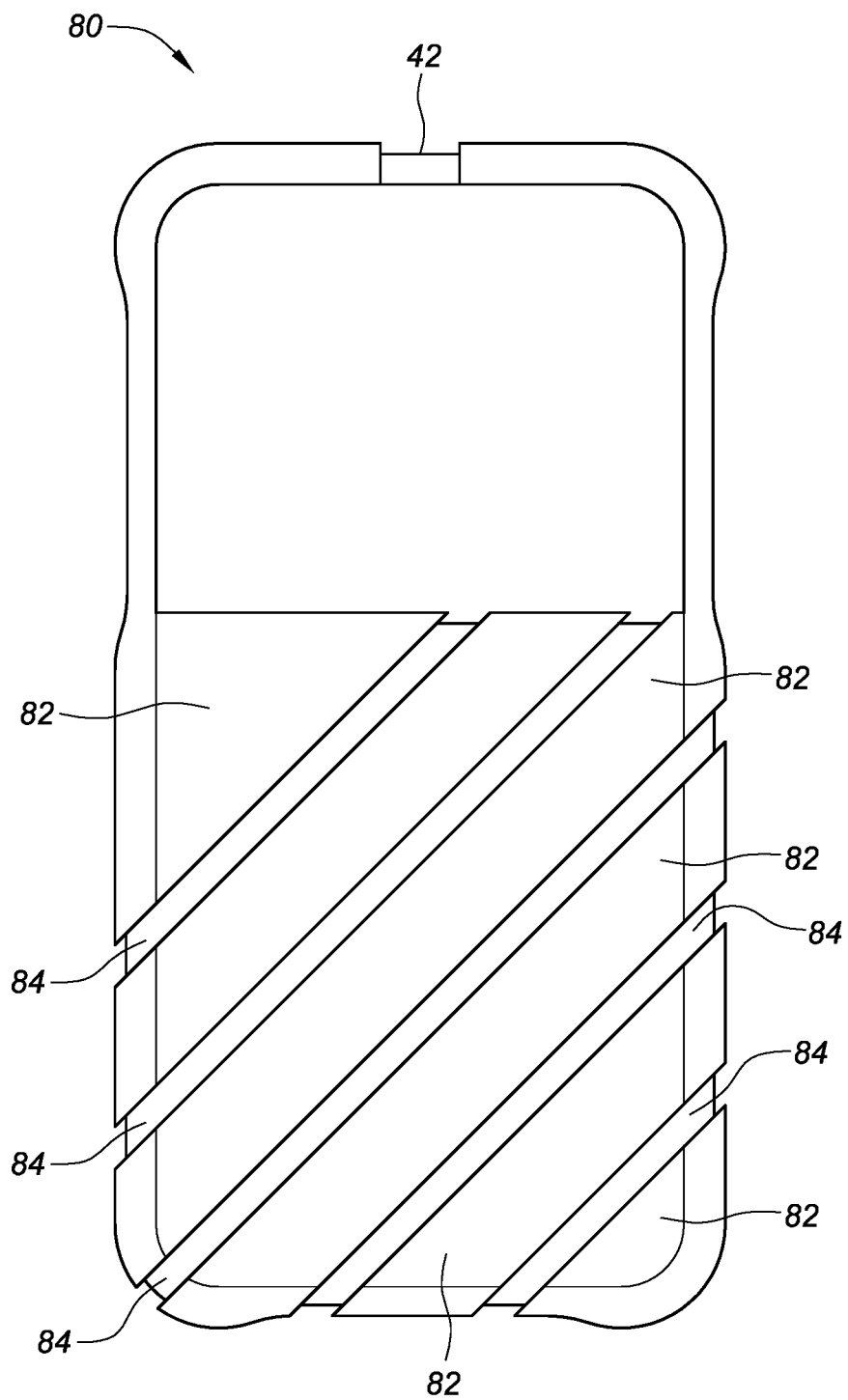
FIG. 4 illustrates an example of an expandable case with the non-expandable components and the expandable components oriented at an angle to the vertical and horizontal dimensions of the case.

FIG. 4 illustrates an example of an expandable case 80 with the non-expandable components 82 and the expandable components 84 oriented at an angle to the vertical and horizontal dimensions of the case 80. By placing the expanding components at a diagonal line to the horizontal and vertical dimensions of the case, a single expanding component can provide expansion in both the horizontal and vertical dimensions. In the design shown in FIG. 4, five diagonal expansion components 84 couple together six diagonal non-expansion components 82. In other embodiments, more or less expansion components 84 may be used. Typically, in a diagonal configuration, there would always be one more non-expansion component 82 than the number of expansion components 84. However, more than one expansion component 84 could be used to couple two-non-expansions components 82 together. Expansion component 42 is used to couple the top side together.

Figure 5:
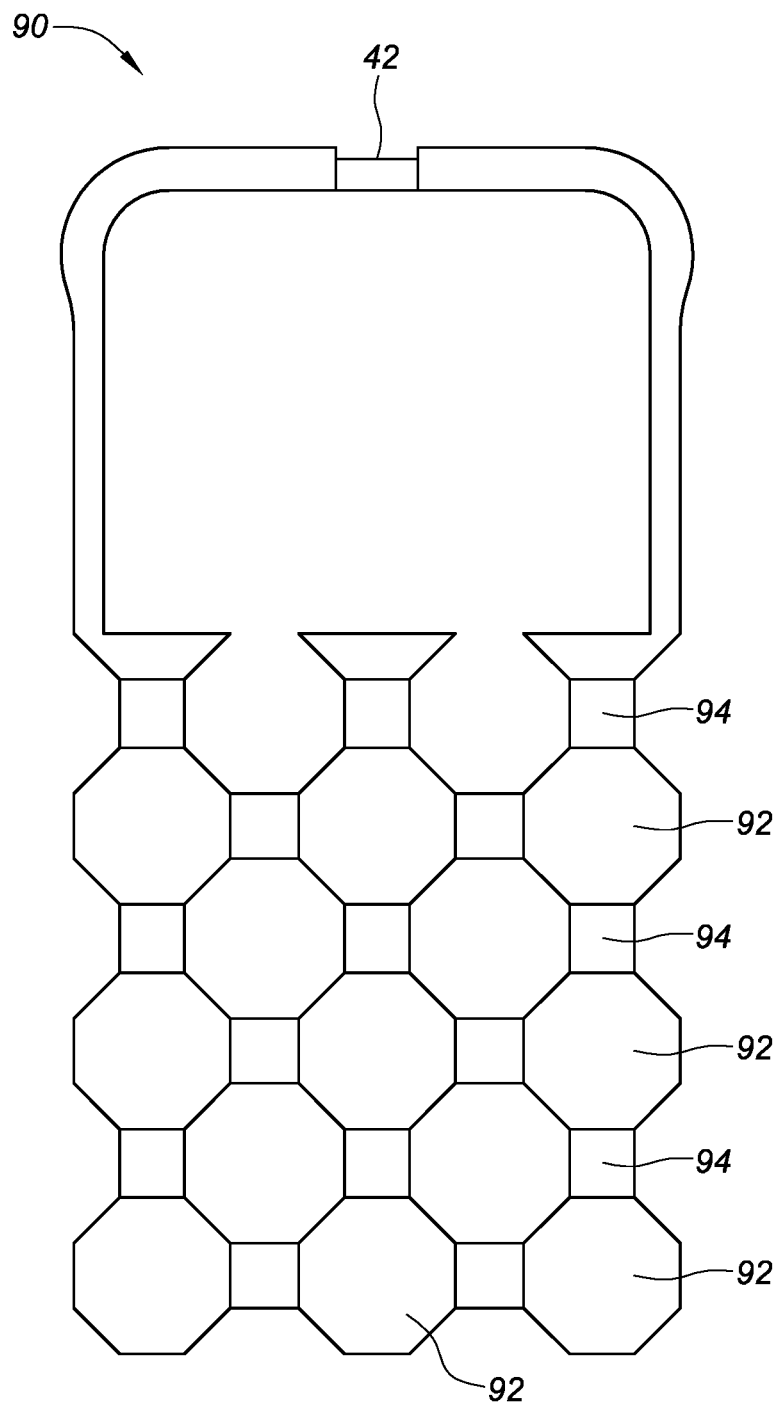
FIG. 5 illustrates an example of an expandable case with non-expandable components shaped as octagons and expandable components shaped as squares.

FIG. 5 illustrates an example of an expandable case 90 with non-expandable components 92 shaped as octagons and expandable components 94 shaped as squares. As may be appreciated, any shape non-expandable component 94 may be used in combination with any shape expandable component 94. The key is that the case is expandable in both the horizontal and vertical direction to accommodate different size mobile devices.

As may be seen in all the figures, the protective case 10 may have a large window 50 on the back of the case 10 to allow clearance for any camera size shape and location. In the embodiment shown in FIG. 1, the window 50 stretches horizontally across the entire back of the case 10 and spans both non-expanding components 12 and 16. In the vertical direction, the window extends from the top of the case 10 at least a quarter of the way down the back of the case. In the embodiment shown in FIG. 1, the window 50 is generally rectangular in shape and extends across the entire width of the back of the case 10.

In embodiments where the oversized window 50 spans the entire horizontal dimension of the case, at least one expandable component 42 will need to be incorporated into the window 50 to allow the case to expand in the horizontal direction. Otherwise, the window would prevent the case from expanding in the horizontal direction. In the embodiments shown herein, the expandable component 42 is placed in the center of the top side of the case 10. However, in other embodiments, it could be placed in other locations or more than one expandable component 42 could be incorporated into the window. For example, two expandable components 42 could be located on the top side of the case 10. In yet other embodiments, no expandable component 42 is used in the perimeter of the window 50; however, a gap is left to allow the window to expand in the horizontal direction along with the rest of the case.

In addition to the oversized window 50, the case 10 has oversized openings on both sides of the case 10 near the top. These oversized openings are designed to accommodate any type of button or port position along the upper side of the mobile device. In the embodiments shown in FIG. 1, the openings are similar in length to the height of the window 50.

The case 10 also has an oversized opening 60 at the bottom side of the case 10. Similar to the window 50 at the top, it may be desirable that the oversized opening 60 at the bottom incorporates an expandable component or at least a gap to allow the oversized opening to expand with the case in the horizontal direction. In the embodiment shown in FIG. 1, the opening 60 on the bottom of the case 10 spans the non-expandable portions 22 and 24. Because the opening 60 in the bottom spans across the flexible material 30, it is comprised by two hard case portions. In the embodiment shown in FIG. 1, no expandable component is integrated into the opening 60 in the bottom of the case 10 but in other embodiments an expandable component could be integrated into the opening 60. In preferred embodiments, the opening 60 in the bottom is continuous and is designed to clear all speakers and power ports.

The non-expandable components 12-24 of the case may be comprised of any type of hard material. In particular, all the types of materials typically used for mobile device protective cases may be used including plastic, rubber, foam, Teflon, wood or any other type of material or combination thereof. Generally speaking, the non-expandable portions of the case may be soft like rubber or hard but cannot be stretched in any significant amount. In contrast, the expandable components 30, 40 and 42 may be made from any material that is flexible and can be stretched such as elastic, soft rubber, or any other material with an elastic property that will allow the case to change dimensions in a meaningful way, i.e. at least 10% in either direction.

In the embodiments taught herein, the non-expandable portions protect the mobile device from damage, shock and scratching while the flexible expandable components allow the case to stretch to any size mobile device. As one skilled in the art will appreciate after reading and understanding the disclosure herein, the invention of an expandable mobile case taught herein in may be accomplished with many different configurations of non-expandable and expandable components. Accordingly, the inventions taught herein should only be limited by the claims below and not by any particular embodiment discussed herein.

What is claimed is:

1. An expandable case for a mobile device comprising:
a rectangular shaped back with a long axis and a short axis;
a plurality of non-expandable components configured to form the rectangular shaped back wherein a subset of the plurality of non-expandable components curve around to form sides of the expandable case;
a plurality of expandable components that couple the non-expandable components together to form the rectangular shaped back wherein at least one expandable component is configured to allow expansion of the rectangular shaped back along the long axis and at least one expandable component is configured to allow expansion of the rectangular shaped back along a short axis; and,
a window located at a top of the back wherein the window extends a full width of the rectangular shaped back and at least a quarter of the way down from a top of the rectangular shaped back.

2. The expandable case of claim 1, wherein the plurality of non-expandable components are arranged in at least two columns and at least two rows.

3. The expandable case of claim 1, wherein the plurality of non-expandable components are arranged in at least two columns and at least three rows.

4. The expandable case of claim 1, further comprising
a first arm attached to a top right non-expandable component wherein the first arm extends up a right side of the case and bends to form a right top portion of the case;
a second arm attached to a top left non-expandable component wherein the second arm extends up a left side of the case and bends to form a left top portion of the case;
wherein the first arm and the second arm define a left side, a right side and a top of the window.

5. The expandable case of claim 4, wherein an expandable component couples the left arm to the right arm along the top of the window.

6. The expandable case of claim 2, wherein the window spans across the at least two columns.

7. The expandable case of claim 1, wherein the plurality of expandable components are made of elastic.

8. The expandable case of claim 1, wherein the case has a bottom side that includes an opening and the opening spans at least fifty percent of a length of the bottom side and the opening has at least one gap that divides the opening into two pieces.

9. The expandable case of claim 1, wherein each non-expandable component in the plurality of non-expandable components is coupled to all adjacent non-expandable components with a separate expandable component.

10. An expandable case for a mobile device comprising:
a rectangular shaped back with a long axis and a short axis;
a plurality of non-expandable components configured to form the rectangular shaped back wherein a subset of the plurality of non-expandable components curve around to form sides of the expandable case and wherein the non-expandable components are arranged in at least two columns and at least two rows;
a plurality of expandable components that couple the non-expandable components together to form the rectangular shaped back wherein at least one expandable component is configured to allow expansion of the rectangular shaped back along the long axis and at least one expandable component is configured to allow expansion of the rectangular shaped back along a short axis; and,
a window located at a top of the back wherein the window extends a full width of the rectangular shaped back and at least a quarter of the way down from a top of the rectangular shaped back.

11. The expandable case of claim 10, further comprising:
a first arm attached to a top right non-expandable component wherein the first arm extends up a right side of the case and bends to form a right top portion of the case;
a second arm attached to a top left non-expandable component wherein the second arm extends up a left side of the case and bends to form a left top portion of the case;
wherein the first arm and the second arm define a left side, a right side and a top of the window.

12. The expandable case of claim 11, wherein an expandable component couples the left arm to the right arm along the top of the window.

13. The expandable case of claim 10, wherein the window spans across the at least two columns.

14. The expandable case of claim 10, wherein the plurality of expandable components are made of elastic.

15. The expandable case of claim 10, wherein the case has a bottom side that includes an opening and the opening spans at least fifty percent of a length of the bottom and the opening has at least one gap that divides the opening into two pieces.

16. An expandable case for a mobile device comprising:

a rectangular shaped back with a long axis and a short axis;

a plurality of non-expandable components that are rectangular in shape and are configured to form the rectangular shaped back wherein a subset of the plurality of non-expandable components curve around to form sides of the expandable case and wherein the non-expandable components are arranged in at least two columns and at least three rows;

a plurality of expandable components made from elastic that couple the non-expandable components together to form the rectangular shaped back wherein at least one expandable component is configured to allow expansion of the rectangular shaped back along the long axis and at least one expandable component is configured to allow expansion of the rectangular shaped back along a short axis; and, a window located at a top of the back wherein the window extends a full width of the rectangular shaped back and at least a quarter of the way down from a top of the rectangular shaped back.

17. The expandable case of claim 16, further comprising:

a first arm attached to a top right non-expandable component wherein the first arm extends up a right side of the case and bends to form a right top portion of the case;

a second arm attached to a top left non-expandable component wherein the second arm extends up a left side of the case and bends to form a left top portion of the case;

wherein the first arm and the second arm define a left side, a right side and a top of the window.

18. The expandable case of claim 17, wherein an expandable component couples the left arm to the right arm along the top of the window.

19. The expandable case of claim 16, wherein the window spans across the at least two columns.

20. The expandable case of claim 16, wherein the case has a bottom side that includes an opening and the opening spans at least fifty percent of a length of the bottom and the opening has at least one gap that divides the opening into two pieces.

* * * * *